(12) United States Patent
Ramsey

(10) Patent No.: US 6,229,436 B1
(45) Date of Patent: May 8, 2001

(54) ANTI-THEFT DEVICE FOR VEHICLES

(76) Inventor: Jerome Ramsey, 20 Hansbury Ave., Newark, NJ (US) 07112

( * ) Notice: Subject to any disclaimer, the term of this patent is extended or adjusted under 35 U.S.C. 154(b) by 0 days.

(21) Appl. No.: 09/559,946

(22) Filed: Apr. 27, 2000

Related U.S. Application Data

(60) Provisional application No. 60/136,343, filed on May 28, 1999.

(51) Int. Cl.⁷ ..................................................... B60R 25/10
(52) U.S. Cl. ....................... 340/426; 340/425.5; 340/471; 307/10.2; 362/503
(58) Field of Search ............................... 340/425.5, 426, 340/438, 458, 330, 331, 332, 471, 472; 307/10.1, 10.2, 10.3, 9.1; 180/167, 272, 287; 280/735; 359/533; 362/503

(56) References Cited

U.S. PATENT DOCUMENTS

| 4,981,363 | * | 1/1991 | Lipman | 362/503 |
| 5,861,801 | * | 1/1999 | Cullen | 340/426 |
| 5,988,839 | * | 11/1999 | Pokorney et al. | 362/503 |

* cited by examiner

Primary Examiner—Van T. Trieu
(74) Attorney, Agent, or Firm—Goldstein & Canino

(57) ABSTRACT

An anti-theft device for vehicles including a plurality of flashing lights disposed around a periphery of a windshield of a vehicle. The flashing lights are in communication with sensors disposed intermittently within the vehicle. The flashing lights are powered by a power source positioned within the vehicle. A strobe light is disposed within a dashboard of the vehicle. The strobe light is in communication with the sensors. The strobe light is powered by the power source.

1 Claim, 1 Drawing Sheet

ANTI-THEFT DEVICE FOR VEHICLES

CROSS REFERENCE AND RELATED SUBJECT MATTER

This application relates to subject matter contained in provisional patent application Ser. No. 60/136,343, filed in the United States Patent & Trademark Office on May 28, 1999.

BACKGROUND OF THE INVENTION

The present invention relates to an anti-theft device for vehicles and more particularly pertains to preventing theft of a vehicle by flashing a series of lights without any audible sounds.

It is well known that most newer model vehicles are equipped with an alarm to prevent theft. Most of these alarms are audible and quite loud. The effectiveness of these alarms has been reduced due to the frequent false alarms that occur thereby resulting in people ignoring these sounds. What is needed is a device that will silently deter a would-be-thief from stealing a vehicle.

The present invention seeks to solve the abovementioned problem by providing a security system for vehicles that has strobe lights mounted on the framing just under the edge of the windows connected to an independent electrical source. When the alarm is activated, a silent alarm starts and can't be deactivated by anyone other than the vehicle owner.

The use of anti-theft devices is known in the prior art. More specifically, anti-theft devices heretofore devised and utilized for the purpose of preventing vehicle theft are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, the aforementioned patents do not describe an anti-theft device for vehicles for preventing theft of a vehicle by flashing a series of lights without any audible sounds.

In this respect, the anti-theft device for vehicles according to the present invention substantially departs from the conventional concepts and designs of the prior art, and in doing so provides an apparatus primarily developed for the purpose of preventing theft of a vehicle by flashing a series of lights without any audible sounds.

Therefore, it can be appreciated that there exists a continuing need for new and improved anti-theft device for vehicles which can be used for preventing theft of a vehicle by flashing a series of lights without any audible sounds. In this regard, the present invention substantially fulfills this need.

SUMMARY OF THE INVENTION

In the view of the foregoing disadvantages inherent in the known types of anti-theft devices now present in the prior art, the present invention provides an improved anti-theft device for vehicles. As such, the general purpose of the present invention, which will be described subsequently in greater detail, is to provide a new and improved anti-theft device for vehicles and method which has all the advantages of the prior art and none of the disadvantages.

To attain this, the present invention essentially comprises a plurality of flashing lights disposed around a periphery of a windshield of a vehicle. The flashing lights are in communication with sensors disposed intermittently within the vehicle. The flashing lights are powered by a power source positioned within the vehicle. A strobe light is disposed within a dashboard of the vehicle. The strobe light is in communication with the sensors. The strobe light is powered by the power source.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the invention to provide a new and improved anti-theft device for vehicles which may be easily and efficiently manufactured and marketed.

It is a further object of the present invention to provide a new and improved anti-theft device for vehicles which is of durable and reliable construction.

An even further object of the present invention is to provide a new and improved anti-theft device for vehicles which is susceptible of a low cost of manufacture with regard to both materials and labor, and which accordingly is then susceptible of low prices of sale to the consuming public, thereby making such an anti-theft device for vehicles economically available to the buying public.

Even still another object of the present invention is to provide a new and improved anti-theft device for vehicles for preventing theft of a vehicle by flashing a series of lights without any audible sounds.

Lastly, it is an object of the present invention to provide a new and improved anti-theft device for vehicles including a plurality of flashing lights disposed around a periphery of a windshield of a vehicle. The flashing lights are in communication with sensors disposed intermittently within the vehicle. The flashing lights are powered by a power source positioned within the vehicle. A strobe light is disposed within a dashboard of the vehicle. The strobe light is in communication with the sensors. The strobe light is powered by the power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
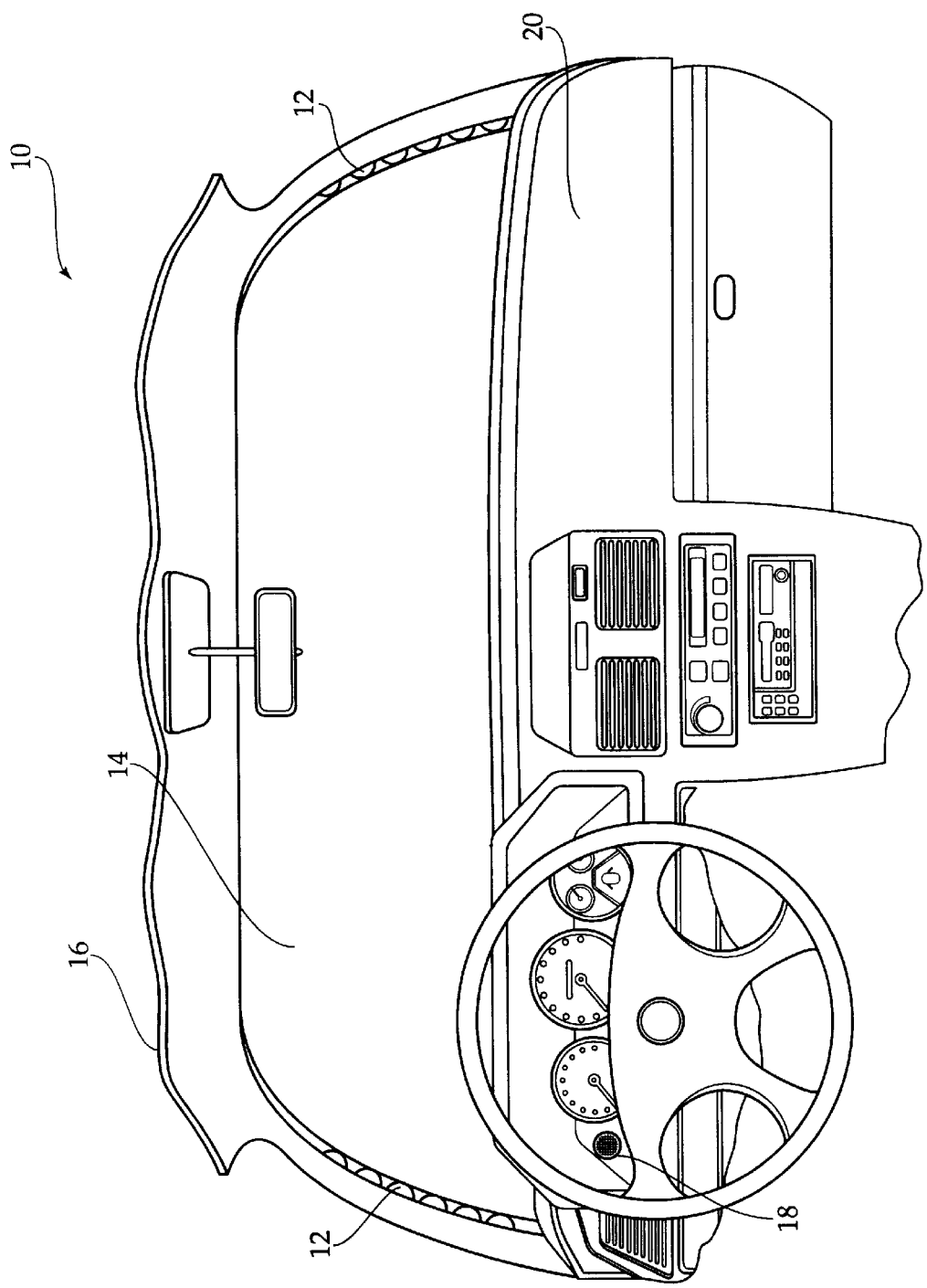
FIG. 1 is a front view of the preferred embodiment of the anti-theft device for vehicles constructed in accordance with the principles of the present invention.

With reference now to the drawings, and in particular, to FIG. 1 thereof, the preferred embodiment of the new and improved anti-theft device for vehicles embodying the principles and concepts of the present invention and generally designated by the reference number 10 will be described.

Specifically, it will be noted in the various Figures that the device relates to a anti-theft device for vehicles for preventing theft of a vehicle by flashing a series of lights without any audible sounds. In its broadest context, the device consists of a plurality of flashing lights and a strobe light. Such components are individually configured and correlated with respect to each other so as to attain the desired objective.

The plurality of flashing lights 12 are disposed around a periphery of a windshield 14 of a vehicle 16. The flashing lights 12 are in communication with sensors disposed intermittently within the vehicle 16. The sensors typically would be disposed within the doors and windows of the vehicle whereby unauthorized entry through the doors and windows or tampering therewith will result in the activation of the flashing lights 12. The flashing lights 12 are powered by a power source positioned within the vehicle 16. The power source could be independent of the vehicle's power source or it could be the power source of the vehicle 16. The location of the power source would preferably be underneath the hood of the vehicle 16.

The strobe light 18 is disposed within a dashboard 20 of the vehicle 16. The strobe light 18 is in communication with the sensors. The strobe light 18 is powered by the power source. The strobe light 18 will also be activated by a disruption of one of the sensors. Deactivation of the strobe light 18 and the lights 12 can only be achieved by the owner of the vehicle 16, typically with the ignition key or door key.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An anti-theft device for vehicles for preventing theft of a vehicle by flashing a series of lights without any audible sounds comprising, in combination:

a plurality of flashing lights disposed around a periphery of a windshield of a vehicle, the flashing lights being in communication with sensors disposed intermittently within the vehicle, the flashing lights being powered by a power source positioned within the vehicle;

a strobe light disposed within a dashboard of the vehicle, the strobe light being in communication with the sensors, the strobe light being powered by the power source.

\* \* \* \* \*